G. HUGHES.
SIGNALING APPARATUS.
APPLICATION FILED JAN. 12, 1907.

948,562.

Patented Feb. 8, 1910.
6 SHEETS—SHEET 1.

WITNESSES.

INVENTOR.

G. HUGHES.
SIGNALING APPARATUS.
APPLICATION FILED JAN. 12, 1907.

948,562.

Patented Feb. 8, 1910.

6 SHEETS—SHEET 2.

WITNESSES.
E. Howard
Joseph Bates.

INVENTOR.
Geo Hughes

G. HUGHES.
SIGNALING APPARATUS.
APPLICATION FILED JAN. 12, 1907.

948,562.

Patented Feb. 8, 1910.
6 SHEETS—SHEET 3.

WITNESSES.

INVENTOR.

G. HUGHES.
SIGNALING APPARATUS.
APPLICATION FILED JAN. 12, 1907.

948,562.

Patented Feb. 8, 1910.
6 SHEETS—SHEET 4.

WITNESSES.
E. Howard
Joseph Bates.

INVENTOR.
Geo. Hughes
by D. Owano'min
atty.

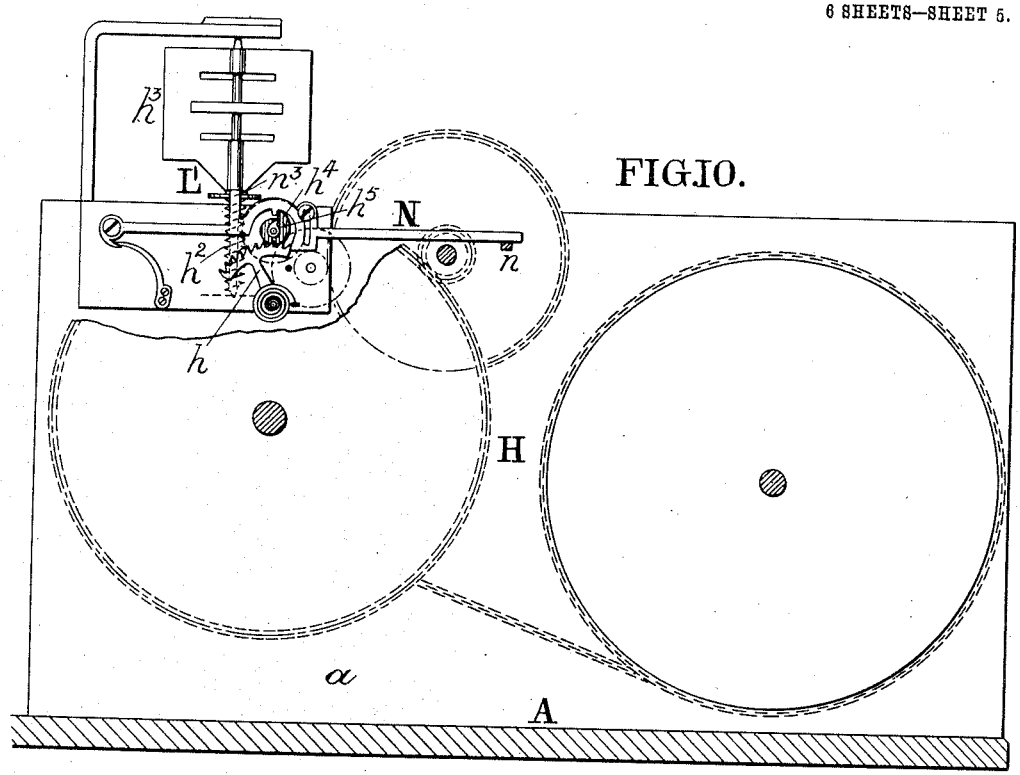
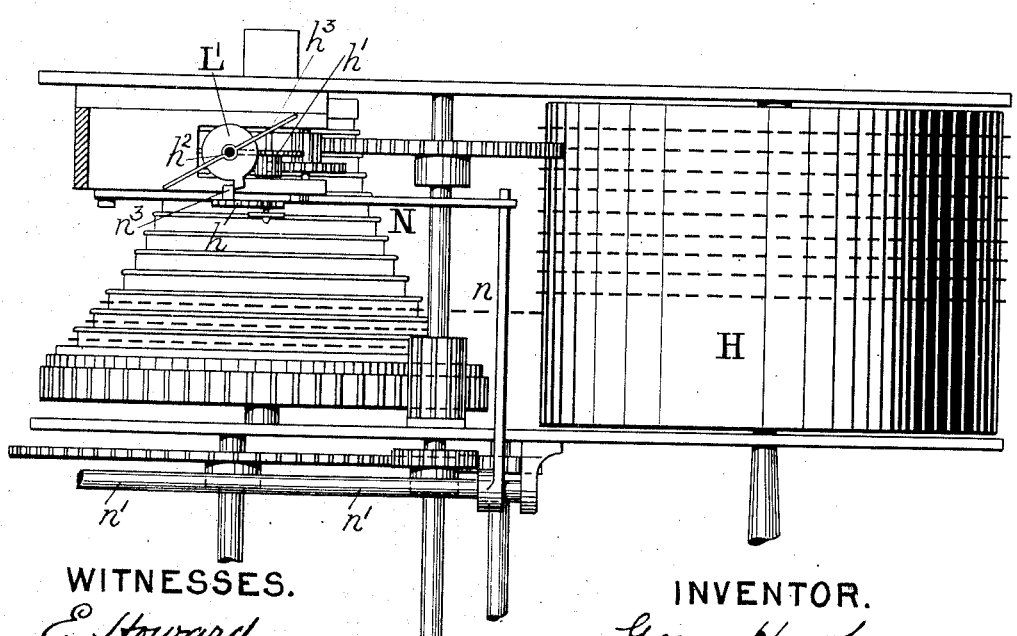

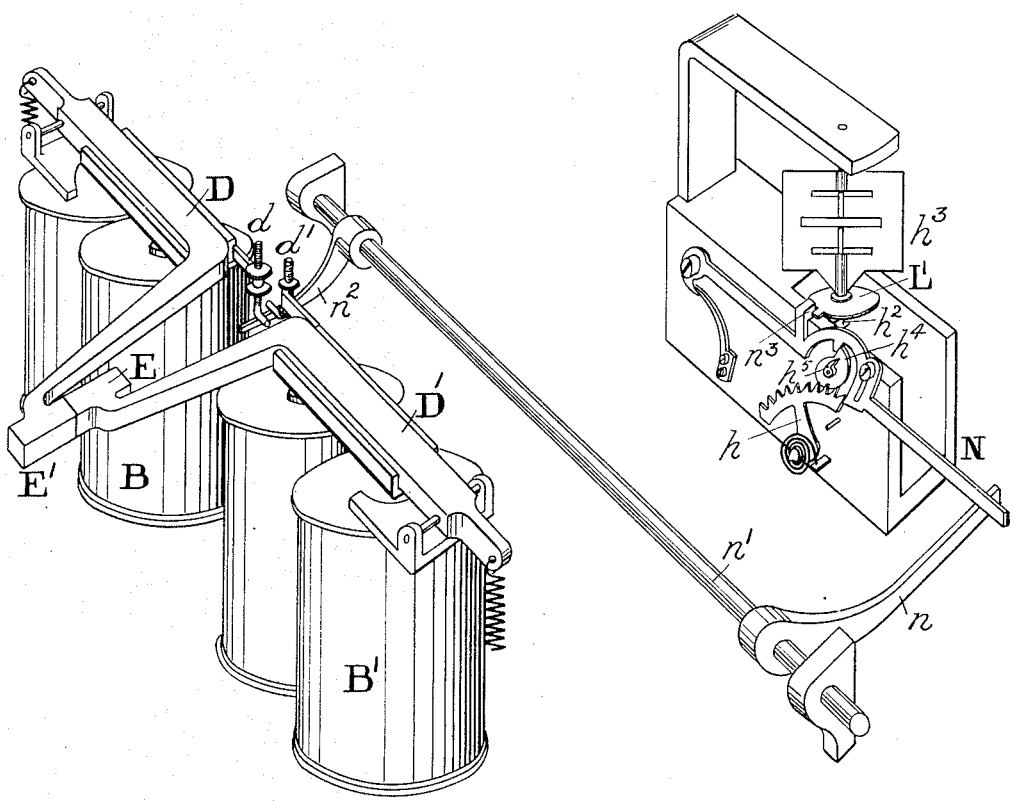
FIG.II.

UNITED STATES PATENT OFFICE.

GEORGE HUGHES, OF BOLTON-LE-MOORS, ENGLAND.

SIGNALING APPARATUS.

948,562.  Specification of Letters Patent.  Patented Feb. 8, 1910.

Application filed January 12, 1907. Serial No. 352,013.

*To all whom it may concern:*

Be it known that I, GEORGE HUGHES, British subject, and resident of Bolton-le-Moors, county of Lancaster, England, have invented certain new and useful Improvements in Signaling Apparatus, of which the following is a specification.

This invention relates to apparatus for use on railways or other places where a telegraph or other form of apparatus is employed for transmitting signals and is designed to provide means for automatically recording all such signals both sent and received as a "time stamp signal record", that is a signal record expressed in the time the signal was transmitted.

The invention may be employed in connection with any signal cabins, stations, places or depots, from which signals are transmitted or received, or it may be employed in other ways or for any purpose.

The invention consists essentially in recording apparatus by which the signal as recorded is expressed in the time at which it was transmitted thereby recording as a single record—"a time stamp signal record" comprising both the signal and the time it was recorded. Thus a single bell call or dash is expressed in time 5.20.2.

and a double bell call or two dashes 5.30.5.
5.30.5.

The invention will be fully described with reference to the accompanying drawings forming part of the specification.

Figure 2:
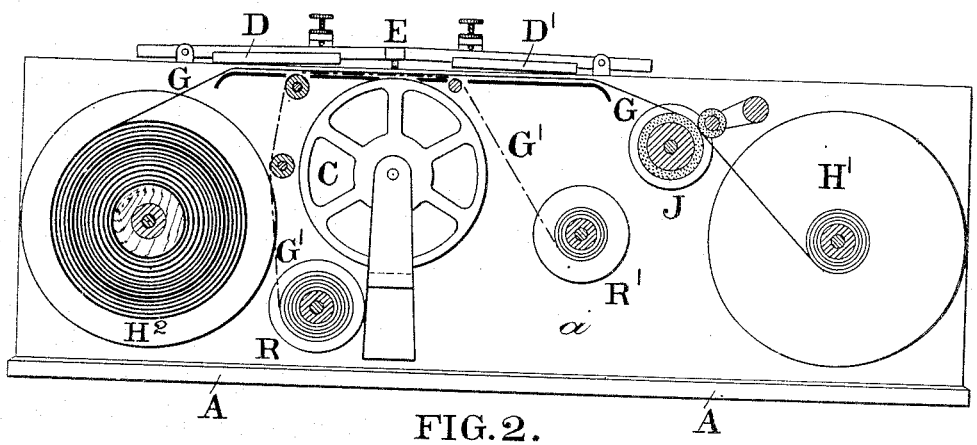
Figure 1:
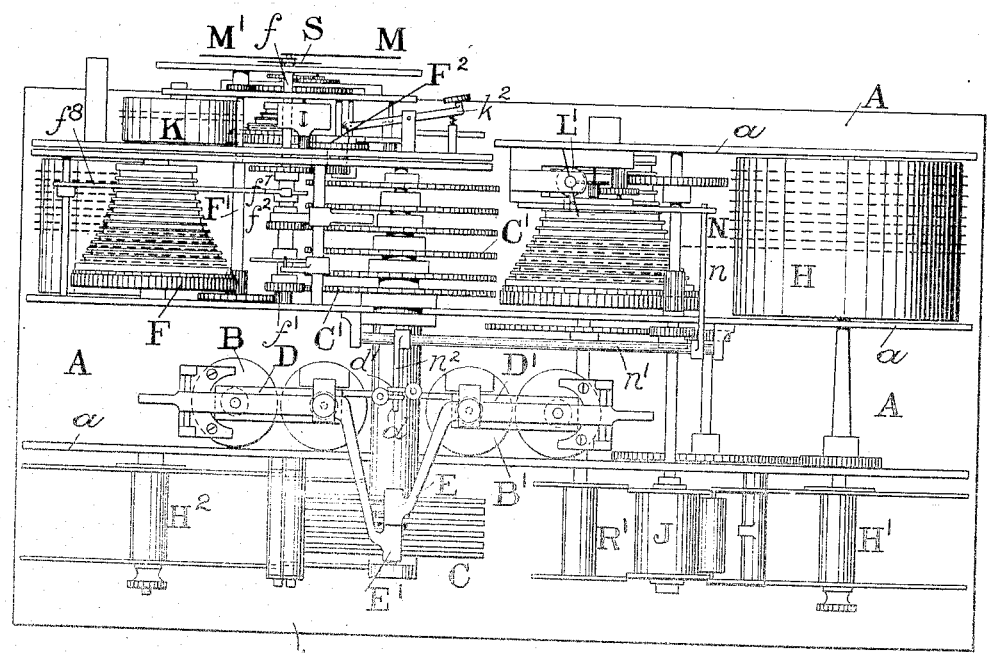
Figure 4:
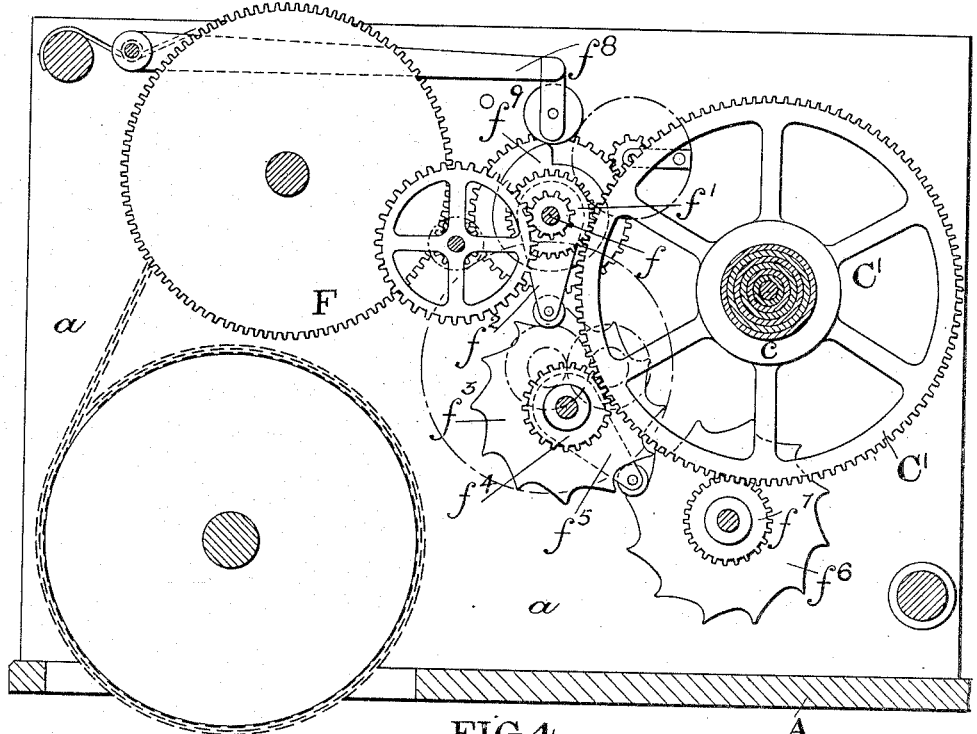
Figure 3:
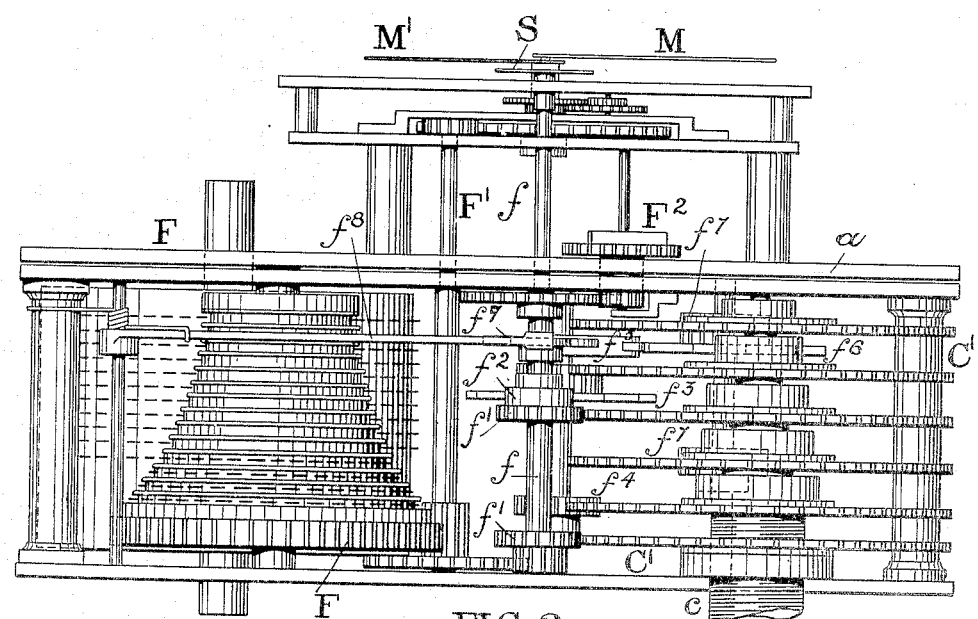
Figure 5:
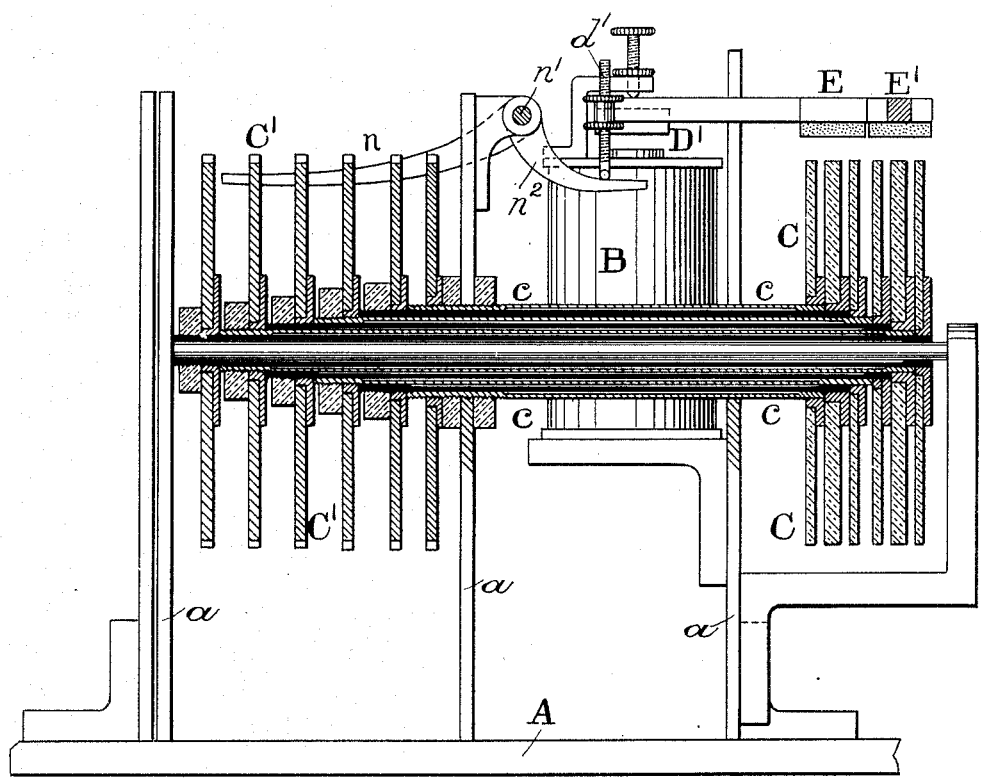
Figure 8:
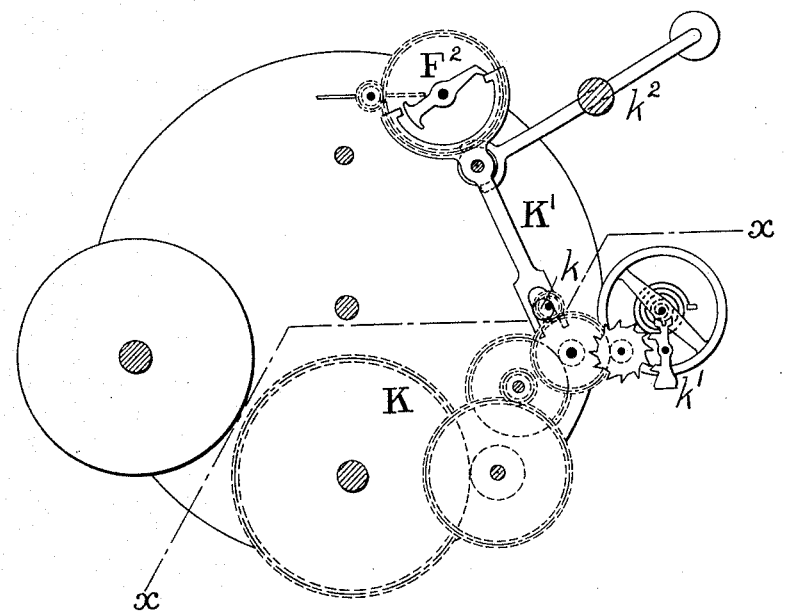
Figure 6:
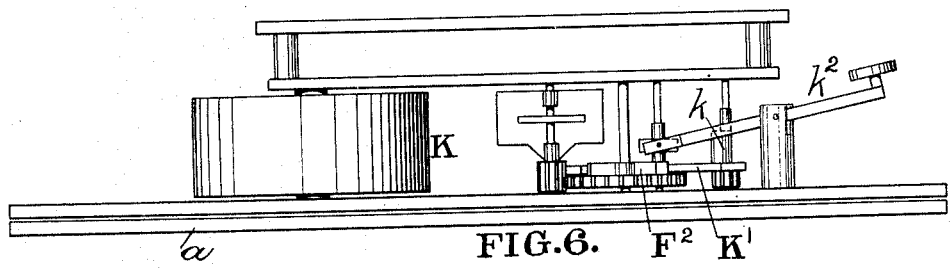
Figure 7:
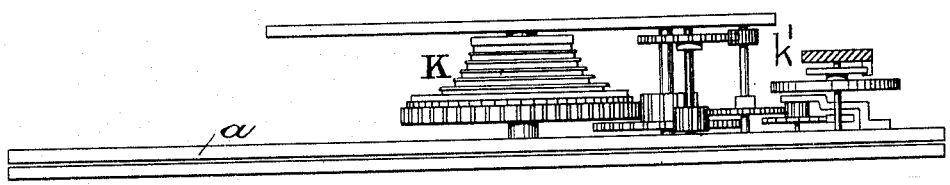

Figure 1 is a plan of the complete apparatus. Fig. 2 is an elevation partly in section showing the time type wheels C the armatures D D' the striker pad E of the magnets and the recording paper G. Fig. 3 is a plan of the clock work motor which operates the time type wheels C. Fig. 4 is an elevation of same partly in section. Fig. 5 is a transverse sectional elevation through the time type wheels C. Fig. 6 is a plan of the clock work mechanism which governs or controls the clock work motor shown in Figs. 3, 4 and 5 showing parts above the line x—x Fig. 8. Fig. 7 is a plan of same showing parts below the line x—x Fig. 8. Fig. 8 is an elevation of the same, partly in section. Fig. 9. is a plan of the clock-work motor which operates or carries forward the record paper G. Fig. 10 is an elevation of same showing the releasing mechanism.

Fig. 11 is a perspective view of the magnets B B' the armatures D D' the striker pads E E' and the mechanism for controlling and releasing the motor clock shown in Figs. 9 and 10.

The several parts of the apparatus are mounted upon a base plate A of metal or wood with frame plates a of the usual form employed with clock-work motors.

In broad outline the apparatus comprises two sets of electro magnets B B' to be placed in electric circuit with the signaling instruments the striker-pads E E' carried by the armatures D D' of the magnets, time type wheels C operated by clock-work motor F, a record paper or record strip G operated or moved forward by a clock work motor H a predetermined period of time after each signal stamped thereon, and mechanism for releasing the clockwork motor H after each impulse of the magnets and permitting it to continue in motion during the time determined upon. The electro magnets B B' are provided with electric contacts or terminals by which they are connected with signaling circuit or with any suitable relay so that they are actuated by each impulse that is passed through the circuit. The armatures D D' of the electro-magnets are each provided with a striker pad E E' which extends to one side of the magnets. Adjacent to the electro magnets a set or sets of time type wheels C are mounted to rotate under the striking pads E E' so placed that when the armatures are attracted downward the pads strike the wheels. The type wheels C comprise hour, minute and seconds wheels that is wheels which are inscribed on their peripheries with type or printing numerals representing hours, minutes and seconds respectively.

The time type wheels C are driven by the spring motor F shown in Figs. 3, 4 and 5. The wheels C are mounted on hollow concentric spindles or sleeves c each wheel mounted on a separate spindle and driven at the other end by a corresponding tooth wheel C'. Each type wheel C is secured at one end of its hollow spindle and the toothed wheel C' at the other, the latter being preferably mounted on a collar screwed onto the shaft and secured in position by a lock nut. The tooth wheels C' are driven by the spring motor F the shaft f being rotated thereby and the first of the toothed wheels C' driven at the desired speed by the pinion $f'$. The second tooth wheel C' is rotated by the arm $f^2$ the star wheel $f^3$ and the pinion $f^4$ the star wheel $f^3$ being rotated one tooth for each revolution of the shaft $f$. The third toothed wheel is rotated by arm $f^5$ the star wheel $f^6$ and the pinion $f^7$, the star wheel $f^6$ being rotated one tooth for each revolution of the star wheel $f^3$. There are two sets of tooth wheels C' correspondingly moved and these in turn rotate two sets of time type wheels C one set of the latter for each magnet. The striker pad E operated by the magnet B presses the record on one side of the type wheels C and the striker pad E' of the other electromagnet B' impresses the record from the other side of type wheels C, and the magnets are so connected electrically that one magnet is influenced under a message sent and the other magnet under a message received, so that the messages sent are impressed on one edge of the record and the messages received are impressed on the other edge. These messages appear on the record in their proper sequence, as described below.

In order to equalize the load on the clock and give the same amount of work to the spring when all the wheels C are being rotated a scroll $f^9$ is mounted on the shaft $f$ against which rests a spring lever $f^8$. At each partial rotation of the shaft $f$ the lever $f^8$ is raised until the arm engages the star wheel $f^3$. At the next movement of the shaft $f$ the lever moves down the face of the scroll $f^9$ thereby assisting the rotation of the shaft $f$ and equalizing the load on the motor. At the extremity of the shaft $f$ is a second finger S, the movement of which corresponds with the movement of the wheels C and C'. It is preferred that the hand S and the wheels C C', should move six seconds or one tenth of a minute at each movement. The shaft F' of the motor-clock F drives through an ordinary clock train minute hand M and hour hand M'. The spring motor F only acts as a motor to drive the time type wheels C and is controlled by a controlling clock K which can be accurately regulated and which periodically releases an escapement $F^2$.

The clockwork mechanism K see Figs. 6, 7 and 8 is of ordinary construction with a train of wheels driving an eccentric $k$ and controlled by an escapement $k'$. The eccentric $k$ oscillates the escapement lever K' and at each revolution and the eccentric $k$ releases the escapement $F^2$ and permits a corresponding movement of the spring motor F which the escapement $F^2$ rotates half a revolution. The clock K is accurately regulated so that the eccentric $k$ makes one revolution every 6 seconds or tenth of a minute thereby permitting the corresponding movement of the spring motor F to drive the time type wheels C. The escapement lever K' may be withdrawn from engagement with the escapement $F^2$ by a lateral movement by means of the lever $k^2$ for the purpose of allowing the motor clock F to run free to set the wheels C and hands M and M'. A record-paper G is caused to pass over the time type wheels C between them and the striker-pads E E' so that at each impulse of the magnets B B' an imprint from the wheels is made upon the paper strip G.

As described above the striker pad E is adapted to cause an imprint on the record from one side of the type wheels and the striker pad E from the other side, one magnet being adapted to operate under the influence of messages sent and the other magnet to operate under the influence of messages received, so that all messages sent appear on one edge of the record and all messages received on the other edge, the messages sent and received appearing in their proper sequence.

The ribbon G is wound upon the drum $H^2$ and is withdrawn therefrom across the type wheels C onto a drum H' driven by any suitable mechanism preferably by a driving roller J provided with a tension roller and driven by clockwork spring or other suitable motor H. An ink ribbon G' is carried forward with the record-paper G to give the imprint upon the paper.

The spring motor H, Figs. 9 and 10, is separate from the spring motor F and is released simultaneously with the impulse or movement of the armatures D D' consequent upon the signal and draws the record paper G. The spring motor H is permitted to run after each release for a definite space of time, to allow for a given movement of the record paper G. It is controlled and released by an escapement lever N which is raised by the lever $n$ on the rocking shaft $n'$ the shaft $n'$ being rocked by the lever $n^2$ with which an arm $d$ or $d'$ on the armatures D D' engages at each impulse and depression of the armatures. When the escapement lever N is raised it releases the disk L' which permits the motor clock H to start and continue running until the lever N falls again and engages the disk L'. The disk L' is provided with a projection or tooth on its periphery with which engages a projection or stop pin $n^3$ on the escapement lever N. The escapement lever N is maintained raised for the desired period by the quadrant escapement $h$ which is projected forward under the lever N by a spring each time the lever N is raised thereby preventing the return of the lever N to normal position until the quadrant escapement $h$ has been withdrawn. The disk L' is rotated by a worn wheel $h'$ and worm $h^2$ and on the worm spindle is mounted a retarding fan $h^3$ to prevent too high a speed. On the spindle of the worm wheel $h'$ a disk or scroll $h^4$ with a single tooth $h^5$ is mounted. When the escapement quadrant $h$ is projected under the escapement lever N the tooth $h^5$ at each revolution moves it back the distance of one tooth until the lever N drops off it into normal position shown in Figs. 10 and 11. The scroll $h^4$ raises the lever N as the tooth $h^5$ engages the teeth of the escapement $h$.

It is obvious that any other suitable form of stop motion or escapement may be applied to the clock-motor H. The worm wheel $h'$ and its shaft are driven by an ordinary clockwork train as are also the roller J and drum H'. A uniform intermittent feed is thus given to the record paper G. The ink-tape G' travels between the record-paper G and the type wheels C and is wound off the drum R onto the drum R' by the spring motor H.

When a signal is transmitted one of the electromagnets B or B' is energized and attracts the corresponding armatures D and D' and causes the striker-pad E or E' to press the record-paper G against the ink-tape G' and the time type wheels C thus stamping on the record paper G the time as indicated by the wheels. The movement of the armatures D and D' at the same time depresses the lever $n^2$ rocks the shaft $n'$ and raises the lever $n$ thereby lifting the escapement lever M releases the clock motor H and the record-paper G is thereby traversed across the time type wheels C. A fresh surface of the record paper G is then brought under the striking pads E for the next signal. The time feed of the paper is governed by the quadrant escapement which permits a predetermined travel or feed after each signal is completed. As the motor clock F is released every 6 seconds or ten times every minute and the time type wheels C are correspondingly moved the time on the wheels C to be recorded on the record-paper as a "time stamp signal" will be altered 10 times every minute which is a division of time sufficiently fine for the purpose of record.

A signal is expressed on the record paper G by the position of the line of numerals—indicating line—and the number of such lines of numerals, one operation printing and recording both the signal transmitted and the time thus:—

A single bell call or a dash is expressed in time in a single line:—
5.20.2.

A double bell call or two dashes is expressed in time in two lines:—
5.30.5.
5.30.5.

A treble bell call with a pause between the second and third signal calls is expressed in turn in two lines, a space and a single line:—
5.40.5.
5.40.5.

5.40.6.

The following table is inserted as an example of a length of the recording paper G showing the signals recorded thereon the messages being deciphered in the margin.

EXAMPLES OF COMPLETE SIGNALS.

ORDINARY PASSENGER TRAIN.

| | | |
|---|---|---|
| Attention | 5.20.2 | 5.20.4 |
| Acknowledgment | | |
| Is line clear for ordinary passenger train? | 5.20.5 5.20.5 5.20.5 5.20.5 | |
| Yes, you may send ordinary train through | | 5.20.6 5.20.6 5.20.6 5.20.7 |
| Train in section | 5.21.8 5.21.8 | |
| Line clear, or train out of section | | 5.22.1 5.22.1 5.22.2 |
| Acknowledgment to line clear | 5.22.2 | |

BRANCH GOODS TRAIN.

| | | |
|---|---|---|
| Attention | 5.40 | 5.40.4 |
| Acknowledgment | 5.40.5 | |
| Is line clear for branch goods train | 5.40.6 | 5.40.7 |
| Yes, you may send branch goods train through | | 5.40.8 5.40.8 |
| Train in section | 5.45.1 5.45.1 | |
| Line clear, or train out of section | | 5.47.3 5.47.3 5.47.4 |
| Acknowledgment to line clear | 5.47.4 | |

EXPRESS PASSENGER TRAIN.

| | | |
|---|---|---|
| Attention | 7.15.4 | 7.15.8 |
| Acknowledgment | | |
| Is line clear for express passenger train? | 7.15.9 7.15.9 7.15.9 7.16.0 | |
| Yes, you may send express passenger train through | | 7.16.0 7.16.1 7.16.1 7.16.1 |
| Train in section | 7.18.3 7.18.3 | |
| Line clear, or train out of section | | 7.20.1 7.20.1 7.20.2 |
| Acknowledgment to line clear | 7.20.2 | |

EXPRESS CATTLE TRAIN.

| | | |
|---|---|---|
| Attention | 9.9.8 | 9.10.1 |
| Acknowledgment | 9.10.2 | |
| Is line clear for express cattle train | 9.10.3 9.10.3 9.10.4 9.10.4 | |
| Yes, you may send express cattle train through | | 9.10.5 9.10.6 9.10.6 9.10.6 9.10.7 |
| Train in section | 9.12.1 9.12.1 | |
| Line clear, or train out of section | | 9.14.3 9.14.3 9.14.4 |
| Acknowledgment to line clear | 9.14.4 | |

What I claim as my invention and desire to protect by Letters Patent is:—

1. In a time stamp signal recorder, the combination of duplicate time type wheels; means to impress an imprint on one edge of a record paper from one set of type wheels when a message is sent; means to impress an imprint on the other edge of the record paper from the other type wheels when a message is received; means for feeding forward the record paper; and means for stopping the feed of record paper after a message is completed.

2. In a time stamp signal recorder, the combination of duplicate time type wheels; means to impress a record paper at one edge or the other at the time a signal is respectively transmitted or received; a spring motor to move the time type wheels; another spring motor to feed forward the record paper; means to permit this motor to continue to run and feed forward a predetermined length of paper after each signal is recorded; and means to arrest the movement of this motor.

3. In a time stamp signal recorder, the combination of duplicate time type wheels adapted to record the messages sent and received on opposite edges of a record paper; a prime spring motor to move forward the time type wheels a fractional part of a minute; a second spring motor to regulate and determine the time at which the prime motor works; means to strike and impress the record paper; a spring motor to feed forward the record paper; and means to start the paper feed motor at each signal and stop it after a predetermined period.

4. In a time stamp signal recorder, the combination of duplicate time type wheels; a spring motor to drive the time type wheels; striker pads to impress a record paper upon the wheels; electromagnets and armatures carrying the said striker pads to which an impulse is given at each signal transmitted; and a motor to feed forward the record-paper; means to start the feed motor simultaneously with the impulse of the magnet and to stop it again at a predetermined period after the signal.

5. In a time stamp signal recorder, the combination of duplicate time type wheels C; a spring motor F by which the time type wheels are driven; magnets B B' which are energized as each signal is transmitted; armatures D D' of said magnets; striker pads E E' operated by the said armatures and by means of which a record-paper is impressed upon the time type wheels at each signal; a spring motor H by which the record-paper is fed forward; and means to release and start the paper feed motor H at each impulse of the magnets and stop it again after a predetermined period has elapsed.

6. A time stamp signal recorder comprising in its construction duplicate hour, minute and fractional minute time type wheels; independent concentric spindles carrying the time type wheels; a spring motor by which the concentric spindles and time type wheels are driven separately; a regulating clock which releases the spring motor periodically, a predetermined number of times each minute; magnets energized as each signal is transmitted; armatures corresponding with said magnets; striker pads operated by the said armatures by which a record paper is impressed upon the time type wheels at each signal; a spring motor by which the record paper is fed forward; and means to release and start the paper feed motor at each impulse of the magnets and stop it after a predetermined period has elapsed.

7. In a time stamp signal, the combination of duplicate time type wheels C; the driving wheels C'; the spring motor F; the wheels $f'$, $f^3$, $f^4$, $f^6$; the regulating clock K; the escapement $F^2$ by which the spring motor F is released; the escapement lever K'; the eccentric $k$ by which the escapement lever is oscillated; means for impressing the record paper; and means for feeding it forward.

8. In a time stamp signal, the combination of duplicate time type wheels; means for driving the time type wheels; electromagnets, armatures and striker pads to impress a record paper; a motor to feed forward the record paper; a shaft $n'$ rocked by the armatures of the magnets at each impulse; a lever $n$ thereon; an escapement lever N raised at each impulse by the lever $n$; a quadrant escapement $h$ to be projected forward under the escapement lever when the latter is raised; a stop disk L' to engage the escapement lever; and a rotating tooth to move back the escapement quadrant to stop the motor.

9. In apparatus for recording signals sent and received the combination of magnets connected respectively with the sending and receiving circuits; striking pads operated thereby; duplicate time type wheels whereby the signals sent and received and the time of sending and receiving same are printed at opposite edges of a record paper at each electrification of either magnet.

In witness whereof, I have hereunto signed my name in the presence of two subscribing witnesses.

GEORGE HUGHES.

Witnesses:
J. OWDEN O'BRIEN,
B. LATHAM WOODHEAD.